United States Patent [19]

Brayer

[11] Patent Number: 5,538,059
[45] Date of Patent: Jul. 23, 1996

[54] TIRE AND TIRE RIM ASSEMBLY ADAPTED TO CARRY WEIGHTS

[75] Inventor: Randall R. Brayer, N. Canton, Ohio

[73] Assignee: The Goodyear Tire & Rubber Company, Akron, Ohio

[21] Appl. No.: 327,957

[22] Filed: Oct. 24, 1994

[51] Int. Cl.⁶ .................... B60B 11/08; B60B 21/12; B60C 13/02; B60C 19/00
[52] U.S. Cl. .................... 152/154.1; 152/513; 152/523; 152/544; 301/5.21
[58] Field of Search .................... 152/523, 539, 152/544, 454, 516, 517, 379.3, 379.4, 381.4, 555, 154.1, 513; 301/5.21, 37.22

[56] References Cited

U.S. PATENT DOCUMENTS 2,477,754  8/1949  Kraft .................... 152/523
5,205,880  4/1993  Iida et al. .................... 152/523 X
5,332,016  7/1994  Tsuruta et al. .................... 152/523

FOREIGN PATENT DOCUMENTS 3-186409  8/1991  Japan .

Primary Examiner—Michael W. Ball
Assistant Examiner—Francis J. Lorin
Attorney, Agent, or Firm—David E Wheeler

[57] ABSTRACT

A tire 10, having a rim flange support 18, is provided with void areas 24 in the rim flange support 18, to make possible firm attachment of weights 26 to a rim flange 22 when tire 10 is mounted on a rim 20. The wheel (tire/rim) construction makes balancing of the wheel easier and reduces the possibility that a weight 26 will be lost while the tire is being used.

6 Claims, 2 Drawing Sheets

TIRE AND TIRE RIM ASSEMBLY ADAPTED TO CARRY WEIGHTS

FIELD OF THE INVENTION

The invention relates to pneumatic tires having lower sidewall support.

BACKGROUND OF THE INVENTION

In the prior art, certain tires, because of their specific use, require lower sidewall support, beyond that provided by the apex and turn up of the carcass. In a number of such tires, some racing tires in particular, the lower sidewall support is provided in the form of an extra wedge of rubber integrally molded to the sidewall of the tire. Such a wedge of rubber is axially thickest in the area of the tire that makes contact with the rim flange, and usually is tapered to a point radially about the widest axial cross section width of the tire.

In such tires, the support is referred to as "rim flange support". The rim flange support limits the flexing of the lower sidewall of the tire and reduces the distortion of the tire during cornering, which improves the handling properties of a vehicle at high speeds.

In some racing tires, an inner safety shield is placed inside the tire to help cushion the impact of a catastrophic loss of air from the tire. See for example U.S. Pat. No. 5,246,050 and references cited therein. Although the tires are made uniformly, the safety shield can often cause an imbalance in the tire/rim assembly, and such imbalance can be most expeditiously corrected by mounting weights on the rim, as is conventional in the tire art.

Because of the rim flange support on the tire, however, it is difficult to attach conventional weights to the rim flange.

It is an object of the present invention to provide a tire, and a tire/rim assembly, which improve the technicians' ability to balance a wheel to be used to support a vehicle. Other objects of the invention will be apparent from the following description and claims.

SUMMARY OF THE INVENTION

The invention relates to a pneumatic tire comprising at least a pair of parallel annular beads, carcass plies wrapped around the beads, tread disposed over the carcass plies in a crown area of the tire, sidewalls disposed between the tread and the beads, and a rim flange support molded to a lower sidewall portion of the tire. The improvement comprises the inclusion of substantially evenly spaced void areas having a depth substantially equivalent to the axial width of the rim flange support disposed around the circumference of the tire in the radially innermost portion of the rim flange support. The areas are evenly spaced at 9° to 45° intervals around the circumference of the tire. In the illustrated embodiment, the void areas comprise 3 sides of a substantially rectangular shape and have a circumferential length comprising 2.5° to 7.5° of the tire circumference and a radial height of 0.030 to 0.5 inch. The invention may comprise alternative structures as described below.

In the illustrated embodiment, corners of the rectangular shape are rounded and have a radius of 0.020 to 0.040 inch, and the void areas are evenly spaced at about 18° intervals around the circumference of the tire.

Also provided is a tire rim combination comprising a pneumatic tire mounted on a rim wherein the tire is as described above, and the rim has a conventional configuration, whereby balance weights can be mounted on said rim by clipping said weights to the rim juxtaposed to said void areas.

DETAILED DESCRIPTION OF THE INVENTION

Figure 1:
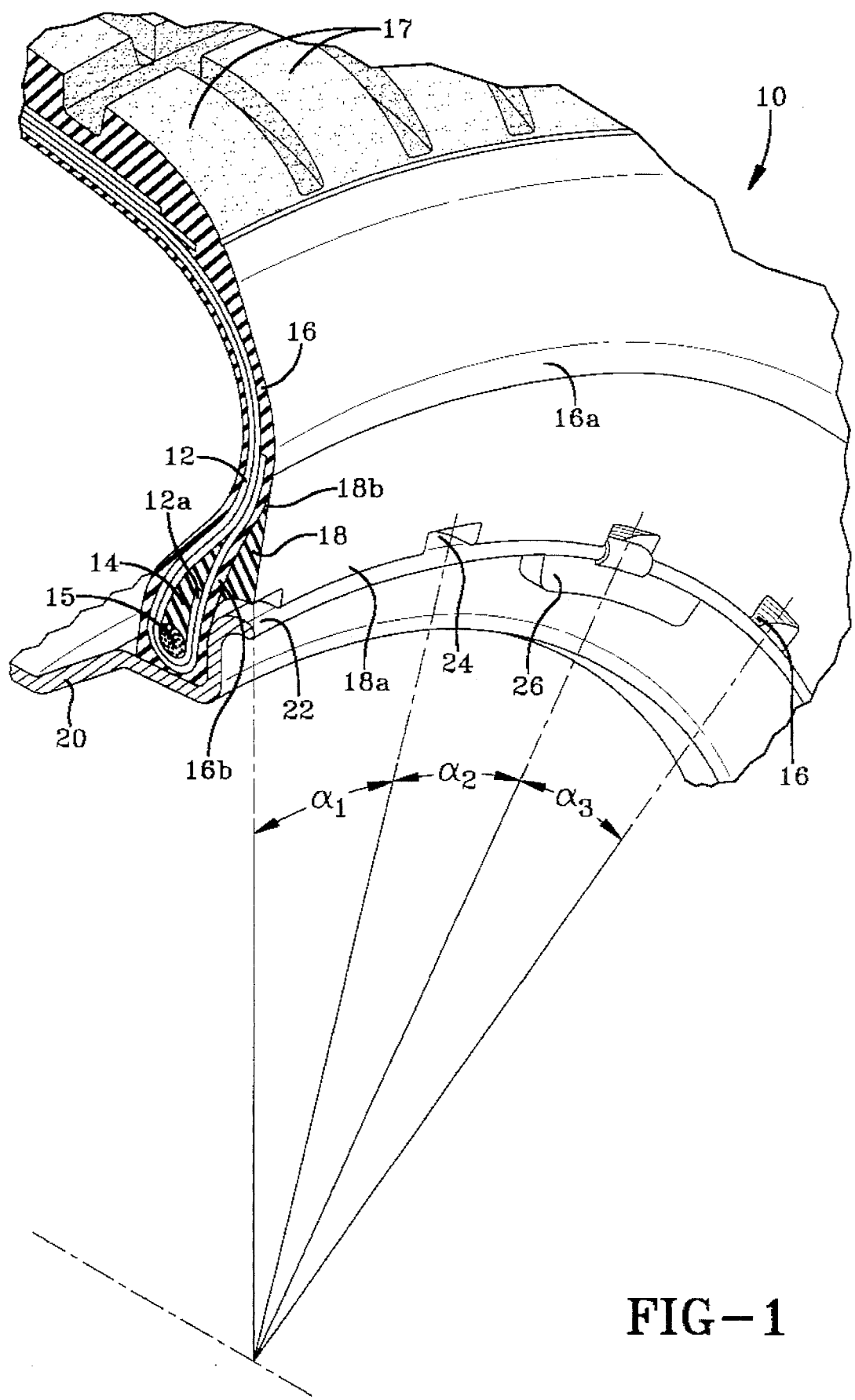
FIG. 1 illustrates a perspective partial view of tire/rim assembly having a tire with a rim flange support, and void areas designed to accommodate attachment of weights to the rim flange.

Referring now to FIG. 1, a tire 10 is shown mounted on a rim 20. Tire 10 comprises carcass plies 12 wrapped around beads 15, and apex 14 is disposed between carcass ply 12 and its turnup portion 12a. Sidewall 16 is disposed between bead 15 and tread 17. Rim flange support 18 is molded to sidewall 16 such that the axially widest portion 18a of rim flange support 18 contacts rim flange 22 when tire 10 is mounted on rim 20. In the illustrated embodiment, rim flange 18 becomes axially narrower as the radially outer portion 18b of rim flange support 18 ends in the proximity of the widest cross section width 16a of tire 10. As illustrated in FIG. 1, void areas 24 are molded into the radially innermost portion 18a of rim flange support 18. As is apparent from the above description, the axially widest portion and the radially innermost portion of rim flange 18 are coincidental, and are both represented by 18a.

In the illustrated embodiment, the void areas are evenly spaced at 9° to 45° intervals around the circumference of the tire, preferably at about 18° to 27° intervals (e.g. in the case of 18°, 360°/18° or 20 void areas are spaced around the tire).

In the illustrated embodiment, the void areas comprise 3 sides of a substantially rectangular shape and have a circumferential length comprising 2.5° to 7.5°, preferably about 5° (5°/360° or 1.4%) of the tire circumference and a radial height of 0.030 to 0.5 inch, preferably 0.1 to 0.25 inch. Also, the corners of the rectangular shape are rounded and have a radius of 0.020 to 0.040 inch.

By void areas, it is meant locations where the rim flange support does not contact the rim when the tire is mounted on a rim. Those skilled in the art will recognize that the rim flange support can be provided by a plurality of wedge shaped rubber sections 18A (see FIG. 2), or other support material, attached to the tire in the lower sidewall portion of the tire, and the spacing 24A between each of the supports can be referred to as void areas as used in the present invention.

Figure 2:
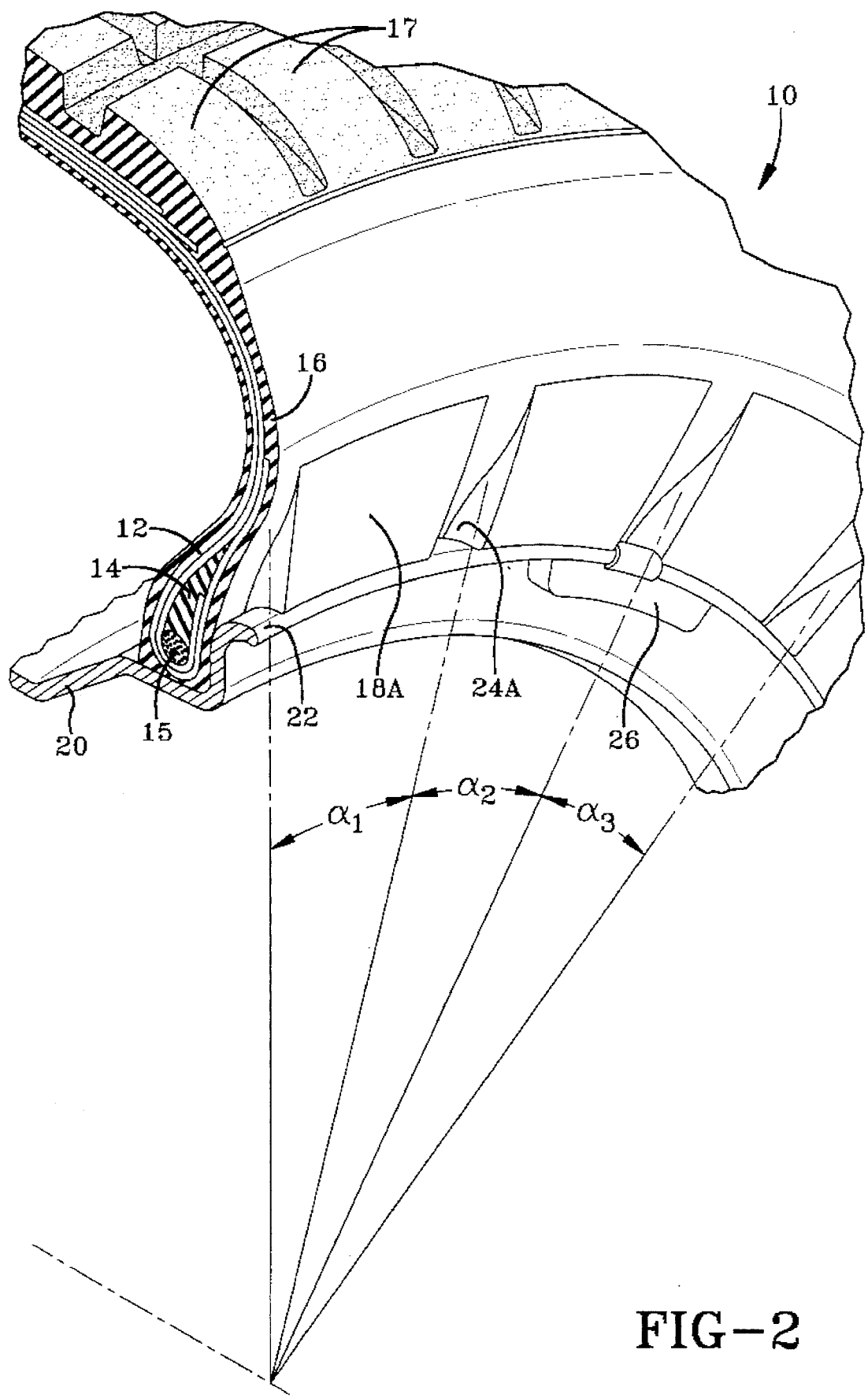
FIG. 2 illustrates a perspective partial view of an alternative tire/rim assembly wherein the rim flange support is segmented.

With reference now to FIGS. 1 and 2, in a preferred embodiment, void areas are evenly spaced at about 18° intervals around the circumference of the tire (i.e. $\alpha_1=\alpha_2=\alpha_3=18°$).

Those skilled in the art will recognize the void areas 24 can be staggered or grouped so long as it is possible to balance the tire/rim assembly by the addition of weights 26.

With reference again to FIGS. 1 and 2, in the illustrated embodiment of a tire/rim combination of the invention, the rim flange support 18 is molded to a lower sidewall portion 16b of the tire 10 and has substantially evenly spaced void areas 24 having a depth substantially equivalent to the axial width of the rim flange support 18 disposed around the circumference of the tire in the radially innermost portion 18a of said rim flange support 18. Those skilled in the art will recognize that the depth of the void areas can be less than the axial width of the rim flange support, the only requirement being that enough space be provided so that balancing weights 26 can be firmly attached to the rim flange 22 in the void areas of the rim flange support 18 without obstruction by the tire.

While the invention has been specifically illustrated and described, those skilled in the art will recognize that the invention can be variously modified and practiced without departing from the spirit of the invention. The scope of the invention is limited only by the following claims.

What is claimed is:

1. A tire rim combination comprising a pneumatic tire mounted on a metal rim wherein said tire comprises at least a pair of parallel annular beads, carcass plies wrapped around said beads, tread disposed over said carcass plies in a crown area of said tire, sidewalls disposed between said tread and said beads, and a rim flange support molded to a lower sidewall portion of said tire to improve handling properties of a vehicle at high speeds, the rim flange support having substantially evenly spaced void areas disposed around the circumference of the tire in the radially innermost portion of said rim flange support, whereby balance weights are mounted on said rim by clipping said weights to the rim juxtaposed to said void areas wherein said void areas are evenly spaced at 9° to 45° intervals around the circumference of the tire, and wherein said void areas have a depth substantially equivalent to the axial width of said rim flange support.

2. The tire/rim assembly of claim 1 in which said void areas comprise 3 sides of a substantially rectangular shape and have a circumferential length comprising 2.5° to 7.5° of the tire circumference and a radial height of 0.030 to 0.5 inch.

3. The tire/rim assembly of claim 2 in which corners of said rectangular shape are rounded and have a radius of 0.020 to 0.040 inch.

4. The tire/rim assembly of claim 2 in which corners of said rectangular shape are rounded and have a radius of about 0.030 inch.

5. The tire/rim assembly of claim 1 wherein said void areas are evenly spaced at about 18° intervals around the circumference of the tire.

6. The tire/rim assembly of claim 1 in which said void areas comprise 3 sides of a substantially rectangular shape and have a circumferential length comprising about 5° of the tire circumference and a radial height of about 0.2 inch.

* * * * *